(12) United States Patent
Ishikawa

(10) Patent No.: US 8,077,970 B2
(45) Date of Patent: Dec. 13, 2011

(54) OPERATION ESTIMATING APPARATUS AND RELATED ARTICLE OF MANUFACTURE

(75) Inventor: Takahiro Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1042 days.

(21) Appl. No.: 11/987,800

(22) Filed: Dec. 4, 2007

(65) Prior Publication Data
US 2008/0130953 A1 Jun. 5, 2008

(30) Foreign Application Priority Data
Dec. 4, 2006 (JP) .................................. 2006-327403

(51) Int. Cl.
*G06K 9/00* (2006.01)

(52) U.S. Cl. ........ 382/181; 382/103; 382/106; 382/100; 382/107

(58) Field of Classification Search ............... 382/103, 382/104, 106, 107, 100, 153, 181, 231
See application file for complete search history.

(56) References Cited

U.S. PATENT DOCUMENTS

| | | | |
|---|---|---|---|
| 7,098,812 B2 | 8/2006 | Hirota | |
| 2003/0156756 A1* | 8/2003 | Gokturk et al. | 382/190 |
| 2005/0063564 A1 | 3/2005 | Yamamoto et al. | |
| 2005/0134117 A1 | 6/2005 | Ito et al. | |
| 2006/0210112 A1* | 9/2006 | Cohen et al. | 382/103 |
| 2007/0110298 A1* | 5/2007 | Graepel et al. | 382/154 |
| 2007/0195997 A1* | 8/2007 | Paul et al. | 382/104 |

FOREIGN PATENT DOCUMENTS

| | | |
|---|---|---|
| JP | A-11-134090 | 5/1999 |
| JP | A-2000-280780 | 10/2000 |
| JP | A-2001-216069 | 8/2001 |
| JP | A-2002-015322 | 1/2002 |
| JP | A-2002-133401 | 5/2002 |
| JP | A-2002-236534 | 8/2002 |
| JP | A-2003-109015 | 4/2003 |
| JP | A-2005-063090 | 3/2005 |

* cited by examiner

*Primary Examiner* — Brian Q Le
*Assistant Examiner* — Edward Park
(74) *Attorney, Agent, or Firm* — Posz Law Group, PLC

(57) ABSTRACT

An operation estimating apparatus includes an image obtaining unit, a human body feature point specifying unit, and an operation estimating unit. The image obtaining unit repeatedly obtains images. The human body feature point specifying unit specifies a predetermined human body feature point of an operator in each of the images. The operation estimating unit estimates one of operations based on the human body feature points. The operation estimating unit compares an actual posture locus of the operator with a transitional estimation model for each of the operations by the operator to obtain a degree of approximation of the transitional estimation model to the actual posture locus. The operation estimating unit estimates that the operator is going to perform the one of the operations that corresponds to an estimated posture locus of the transitional estimation model having the degree of approximation that satisfies a predetermined threshold.

19 Claims, 10 Drawing Sheets

(STEERING WHEEL)

(PASSENGER SEAT)

(REAR VIEW MIRROR)

(RIGHT AIR OUTLET)

(LEFT AIR OUTLET)

(GLOVE BOX)

(CONSOLE BOX)

(NAVIGATION APPARATUS)

(AIR CONDITIONING APPARATUS)

(SHIFT LEVER)

FIG. 12

HUMAN BODY FEATURE POINTS OF 19 KINDS OF OPERATION BEHAVIORS

STATIONARY OPERATION TABLES (1) 30 SETS OF HUMAN BODY FEATURE POINTS ON OPERATION OF NAVIGATION APPARATUS
(2) 30 SETS OF HUMAN BODY FEATURE POINTS ON OPERATION OF AIR CONDITIONING APPARATUS
(3) 30 SETS OF HUMAN BODY FEATURE POINTS ON OPERATION OF STEERING WHEEL
(4) 30 SETS OF HUMAN BODY FEATURE POINTS ON OPERATION OF SHIFT LEVER
(5) 30 SETS OF HUMAN BODY FEATURE POINTS ON OPERATION OF PASSENGER'S SEAT
(6) 30 SETS OF HUMAN BODY FEATURE POINTS ON OPERATION OF INSIDE REAR VIEW MIRROR
(7) 30 SETS OF HUMAN BODY FEATURE POINTS ON OPERATION OF CENTER PANEL RIGHT AIR OUTLET
(8) 30 SETS OF HUMAN BODY FEATURE POINTS ON OPERATION OF CENTER PANEL LEFT AIR OUTLET
(9) 30 SETS OF HUMAN BODY FEATURE POINTS ON OPERATION OF GLOVE BOX
(10) 30 SETS OF HUMAN BODY FEATURE POINTS ON OPERATION OF CONSOLE BOX

TRANSITIONAL OPERATION TABLES

(11) 30 SETS OF HUMAN BODY FEATURE POINT GROUPS IN TRANSITION FROM STEERING WHEEL TO NAVIGATION APPARATUS
(12) 30 SETS OF HUMAN BODY FEATURE POINT GROUPS IN TRANSITION FROM STEERING WHEEL TO AIR CONDITIONING APPARATUS
(13) 30 SETS OF HUMAN BODY FEATURE POINT GROUPS IN TRANSITION FROM STEERING WHEEL TO SHIFT LEVER
(14) 30 SETS OF HUMAN BODY FEATURE POINT GROUPS IN TRANSITION FROM STEERING WHEEL TO PASSENGER'S SEAT
(15) 30 SETS OF HUMAN BODY FEATURE POINT GROUPS IN TRANSITION FROM STEERING WHEEL TO INSIDE REAR VIEW MIRROR
(16) 30 SETS OF HUMAN BODY FEATURE POINT GROUPS IN TRANSITION FROM STEERING WHEEL TO CENTER PANEL RIGHT AIR OUTLET
(17) 30 SETS OF HUMAN BODY FEATURE POINT GROUPS IN TRANSITION FROM STEERING WHEEL TO CENTER PANEL LEFT AIR OUTLET
(18) 30 SETS OF HUMAN BODY FEATURE POINT GROUPS IN TRANSITION FROM STEERING WHEEL TO GLOVE BOX
(19) 30 SETS OF HUMAN BODY FEATURE POINT GROUPS IN TRANSITION FROM STEERING WHEEL TO CONSOLE BOX

OPERATION ESTIMATING APPARATUS AND RELATED ARTICLE OF MANUFACTURE

CROSS REFERENCE TO RELATED APPLICATION

This application is based on and incorporates herein by reference Japanese Patent Application No. 2006-327403 filed on Dec. 4, 2006.

BACKGROUND OF THE INVENTION

1. Field of the Invention

The present invention relates to an operation estimating apparatus for estimating an operation to be performed by the operator.

2. Description of Related Art

In recent years, a technique for estimating the posture or the like of a human being is proposed.

According to the technique, a body model expressing a body by simulation is superimposed in an area corresponding to a human being in an image in accordance with the posture of the human being. By specifying the positions (coordinates) of human body feature points in the body model, the posture or the like of the human being is estimated on the basis of locations of the human body feature points (refer to JP-2003-109015 A).

However, in the above-described technique, the posture or the like of a human being can be estimated. However, for example, the above technique cannot estimate whether or not the human being is going to operate some operational objects. Also, the above technique cannot estimate which operational object to be operated.

SUMMARY OF THE INVENTION

The present invention is made in view of the above disadvantages. Thus, it is an objective of the present invention to address at least one of the above disadvantages.

To achieve the objective of the present invention, there is provided an operation estimating apparatus, which includes an image obtaining means, a human body feature point specifying means, and an operation estimating means. The image obtaining means repeatedly obtains images. Each of the images has a plurality of operational objects and an operator that is positioned to be able to perform operations on the plurality of operational objects. The human body feature point specifying means specifies a predetermined human body feature point of the operator in each of the images that are repeatedly obtained by the image obtaining means. The operation estimating means estimates one of the operations, which the operator is going to perform, based on the human body feature points specified by the human body feature point specifying means in the images. The operation estimating means compares an actual posture locus of the operator with a transitional estimation model for each of the operations by the operator to obtain a degree of approximation of the transitional estimation model to the actual posture locus, the transitional estimation model for the each of the operations being formed based on an estimated posture locus of the each of the operations. Here, the operator is estimated to track the estimated posture locus to operate one of the plurality of operational objects that corresponds to the estimated posture locus. The actual posture locus of the operator is obtained based on the human body feature points specified by the human body feature point specifying means in the images. The operation estimating means estimates that the operator is going to perform the one of the operations that corresponds to the estimated posture locus of the transitional estimation model having the degree of approximation that satisfies a predetermined threshold.

To achieve the objective of the present invention, there is also provided an article manufacture, which includes a computer readable medium readable by a computer system and program instructions carried by the computer readable medium for causing the computer system to execute various procedures as all elements of the above operation estimating apparatus.

BRIEF DESCRIPTION OF THE DRAWINGS

The invention, together with additional objectives, features and advantages thereof, will be best understood from the following description, the appended claims and the accompanying drawings in which:

FIG. 12 is a diagram showing examples of feature points and feature point groups read from an operational table;

DETAILED DESCRIPTION OF THE PREFERRED EMBODIMENTS

Embodiments of the present invention will be described below with reference to the drawings.

(1) General Configuration

Figure 1:
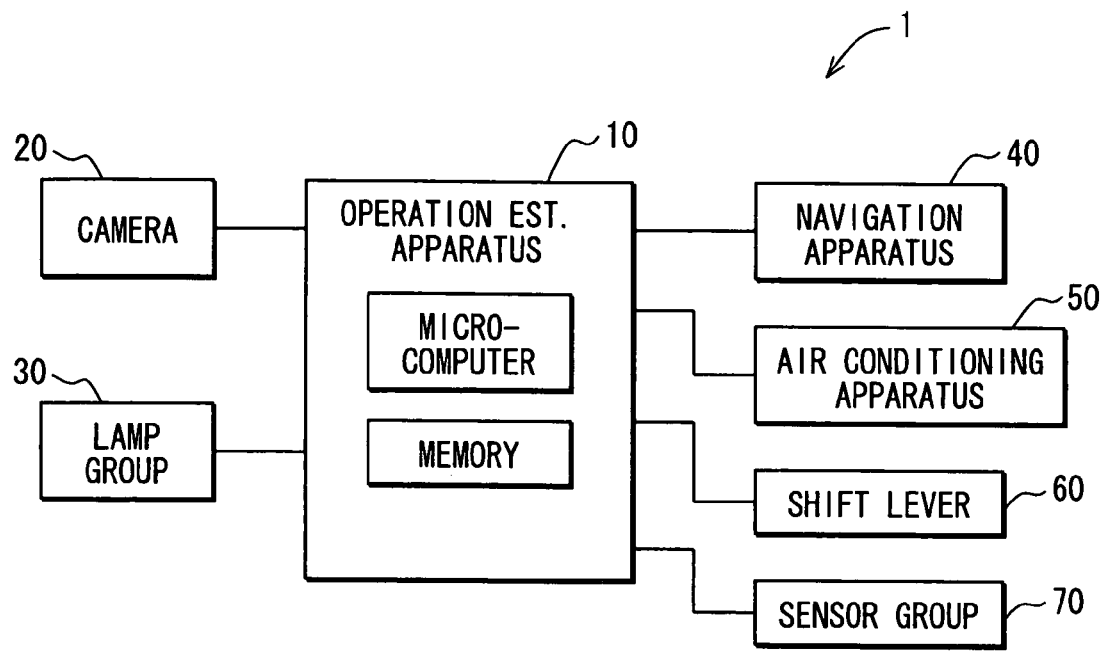
FIG. 1 is a block diagram showing a general configuration of an operation support system.

An operation support system 1 is made of components mounted on a vehicle and, as shown in FIG. 1, includes an operation estimating apparatus 10 as a known ECU having a microcomputer, a memory, and the like, a camera 20 for capturing an image of the interior of the vehicle, a lamp group 30 made of multiple lamps provided around operational objects disposed in the vehicle, a navigation apparatus 40, an air conditioning apparatus 50, a shift lever 60, and a sensor group 70 made of multiple sensors (a proximity sensor, a touch sensor, a switch, and the like) provided around the multiple operational objects disposed in the vehicle.

Figure 2A:
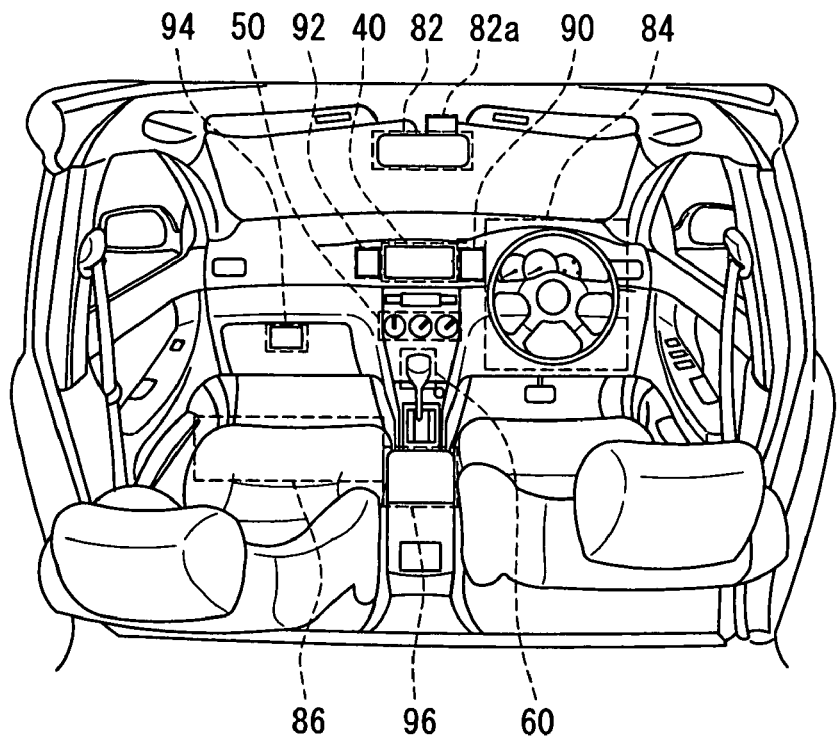
FIGS. 2A and 2B are diagrams showing an interior of a vehicle and an interior of the vehicle captured by a camera, respectively.

In the embodiment, the operational objects disposed in the vehicle include, as shown in FIG. 2A, for example, an inside rear view mirror 82, a steering wheel 84, a passenger seat 86, a center panel right air outlet 90, a center panel left air outlet 92, a glove box 94, a console box 96, the navigation apparatus 40, the air conditioning apparatus 50, and the shift lever 60.

Figure 2B:

The camera 20 is attached in an area 82a above the inside rear view mirror 82 in the vehicle and at the position where the camera 20 can capture images of at least a driver of the vehicle and all of the operational objects the driver can operate in the vehicle. The camera 20 outputs a captured image (refer to FIG. 2B) to the operation estimating apparatus 10.

Each of the multiple lamps of the lamp group 30 is attached in a position such that the each lamp illuminates a corresponding operational object.

Each of the multiple sensors of the sensor group 70 is attached in a position such that the each sensor detects the operation on a corresponding operational object. When the operation on the corresponding operational object is detected, information indicative of the detection result is transmitted to the operation estimating apparatus 10 via a communication path (for example, a network in the vehicle) extending from the sensor to the operation estimating apparatus 10.

(2) Processes Performed by Operation Estimating Apparatus 10

Various processes executed by (the microcomputer of) the operation estimating apparatus 10 in accordance with a program stored in a memory in the apparatus 10 will be described below.

(2-1) Human Body Feature Point Specifying Process

Figure 4:
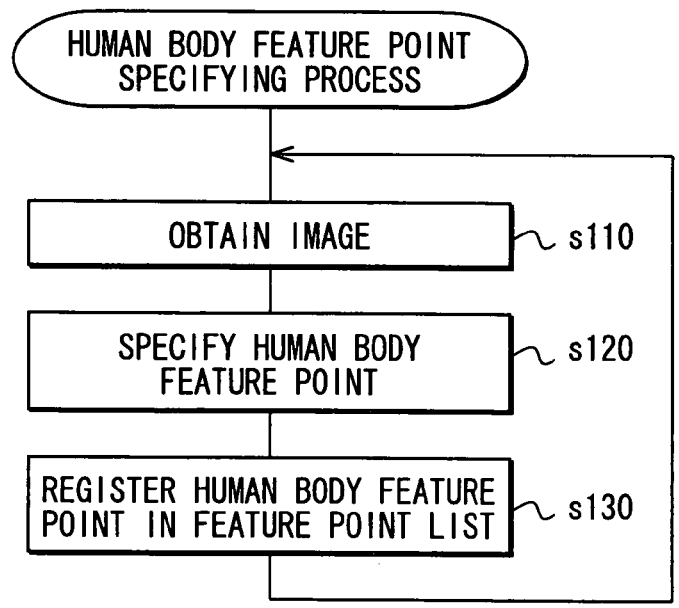
FIG. 4 is a flowchart showing a human body feature point specifying process.

First, the procedure of a human body feature point specifying process repeatedly executed after the operation estimating apparatus 10 is started will be described with reference to FIG. 4.

Figure 3:
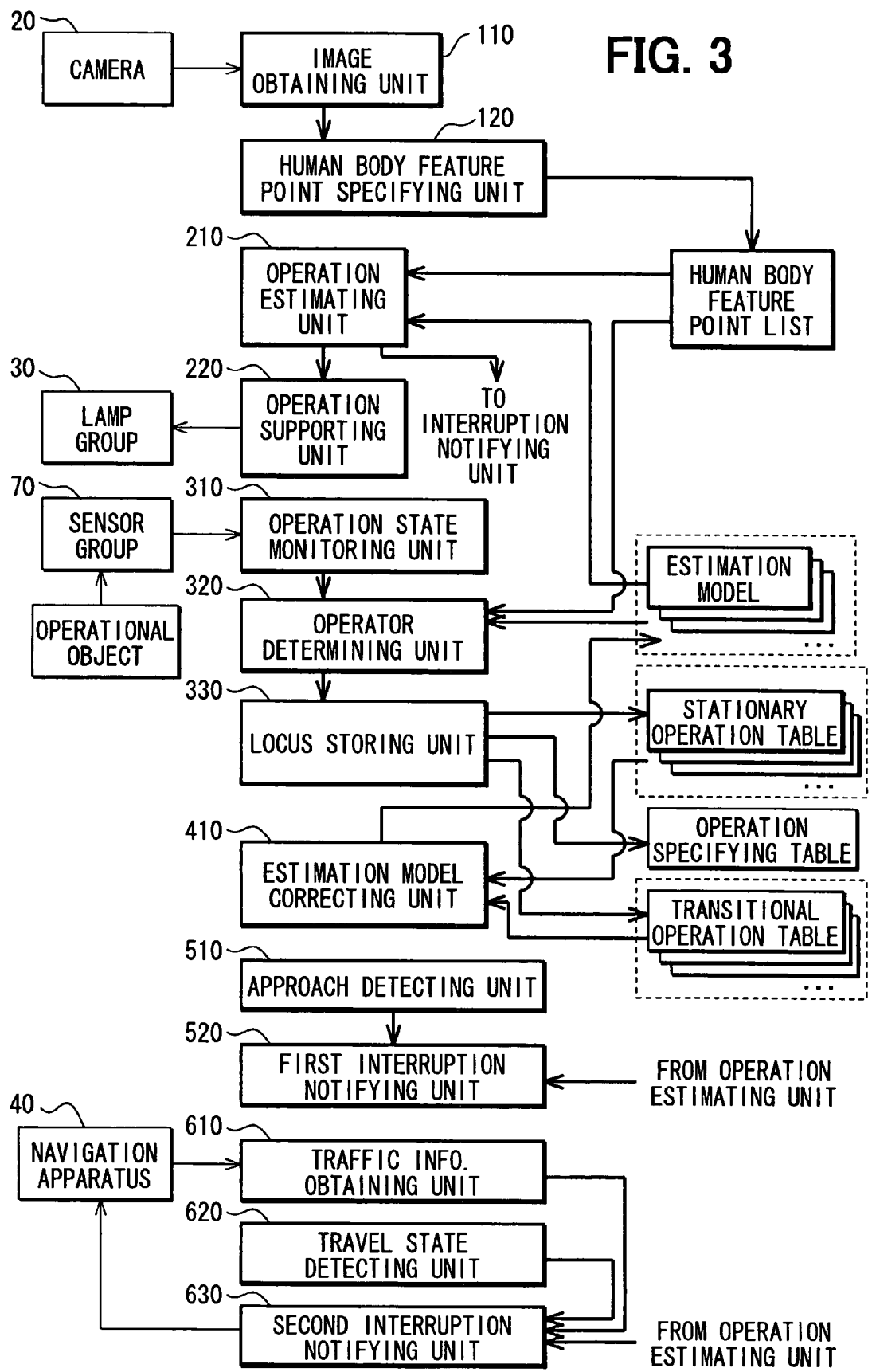
FIG. 3 is a block diagram showing functions in a microcomputer of an operation estimating apparatus.
Figure 5A:
FIGS. 5A to 5J are images captured by the camera and showing a state where the driver operates operational objects.
Figure 5B:
Figure 5C:
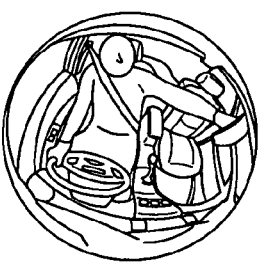
Figure 5D:
Figure 5E:
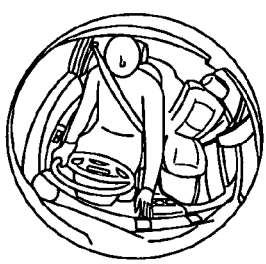
Figure 5F:
Figure 5G:
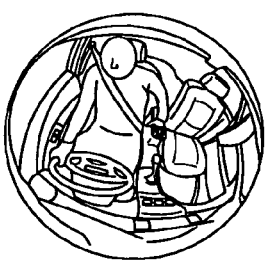
Figure 5H:
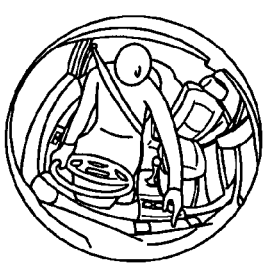
Figure 5I:
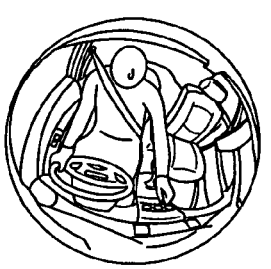
Figure 5J:

The human body feature point specifying process is executed by making the microcomputer in the operation estimating apparatus 10 function as a function block made of an image obtaining means 110 for obtaining an image input from (e.g., image inputted through) the camera 20, and of a human body feature point specifying means 120 for specifying one or more human body feature points in the driver in the image obtained by the image obtaining means 110 (refer to FIG. 3).

When the human body feature point specifying process is started, first, the image obtaining means 110 obtains an image input from the camera 20 (Step S100). In the above step, images showing a state where the driver operates the operational objects are obtained (refer to FIGS. 5A to 5J).

On the basis of the images obtained at Step S110, the human body feature point specifying means 120 specifies each of the one or more human body feature points in the driver in the images (Step S120).

Figure 6:
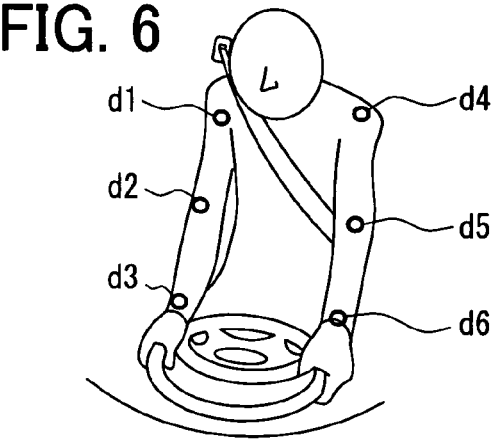
FIG. 6 is a diagram showing positions of human body feature points specified by a human body feature point specifying means.

Specifically, a body model expressing a human body by simulation is superimposed on the posture of the driver in an area corresponding to the driver in the image input from the camera 20. Each of coordinates as references in the body model in the image are specified as human body feature points in the driver in the image. The "reference points in the body model" are, for example, center positions in shoulders, elbows, wrists, and the like (refer to d1 to d6 in FIG. 6, hereinbelow, one of more human body feature points specified from one image will be simply called "human body feature points"). As such superposition of the body model, the technique disclosed in JP-2003-109015 A may be employed.

After the human body feature point specifying means 120 registers human body feature points specified at Step S120 into a human body feature point list (Step S130), the process returns to Step S110.

The human body feature point list is prepared in the memory for registration of the predetermined number N of human body feature points by the first-in first-out method. That is, in the human body feature point list, after the human feature point specifying process is repeated by a predetermined number of times, the predetermined number N of human body feature points counted from the latest one are always registered for each of the reference points in the body model, for example. In the human body feature point list, expected human feature points of specific postures of the driver may be pre-registered as initial values.

(2-2) Operation Supporting Process

Subsequently, the procedure of an operation supporting process repeatedly executed in parallel with the human body feature point specifying process after the operation estimating apparatus 10 is started will be described with reference to FIG. 7.

The operation supporting process is executed by making the microcomputer in the operation estimating apparatus 10 function as a function block made by an operation estimating means 210 for estimating an operation of the driver on the basis of human body feature points registered in the human body feature point list, and an operation supporting means 220 for controlling lighting of the lamp group 30 to support execution of the operation estimated by the operation estimating means 210 (refer to FIG. 3).

When the operation supporting process is started, first, the operation estimating means 210 reads all of the human body feature points registered in the human body feature point list (Step S210) and specifies the posture locus of the driver on the basis of the read human body feature points (Step S220). At Step S220, the human body feature points read at Step S210 are projected to an eigenspace expressed by principle component analysis, and then, the locus of coordinates on the eigenspace, to which the human body feature points are projected, is specified as the locus of an actual posture of the driver (hereinbelow, called "actual posture locus").

After that, by performing comparison of the actual posture locus specified at Step S220 with posture loci and posture points in multiple estimation models read from the memory, the operation estimating means 210 estimates the operation of the driver (e.g., the operation that the driver intends to perform or is performing).

Figure 8A:
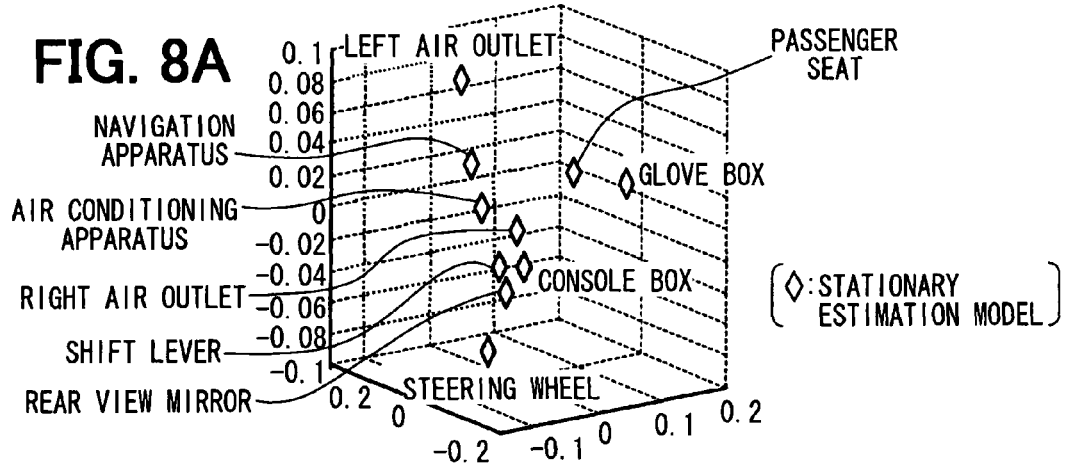
FIGS. 8A to 8E are graphs showing examples of estimated stationary models and estimated transitional models.
Figure 8B:
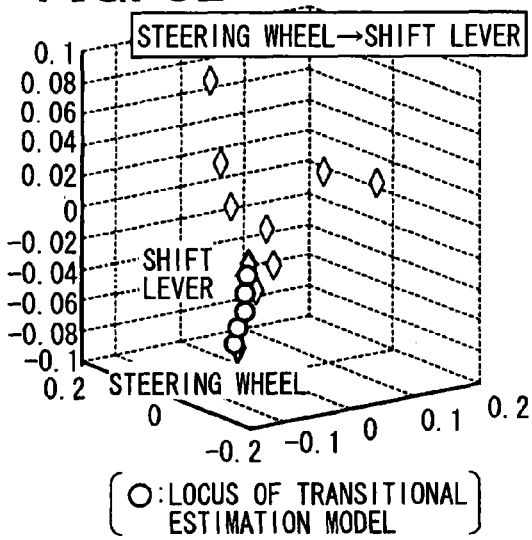
Figure 8C:
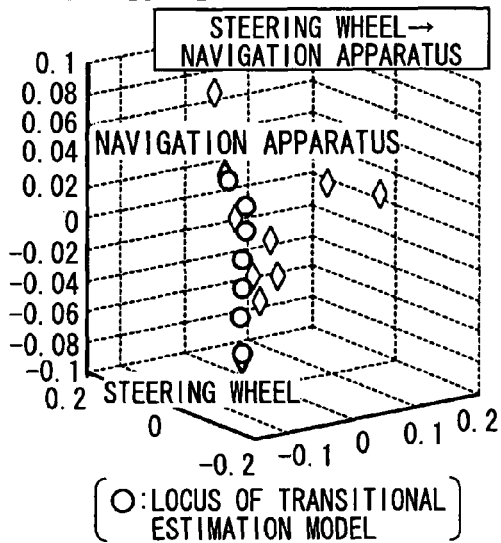
Figure 8D:
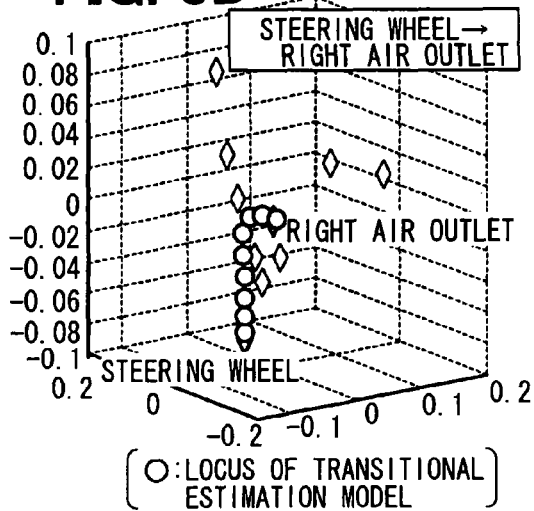
Figure 8E:
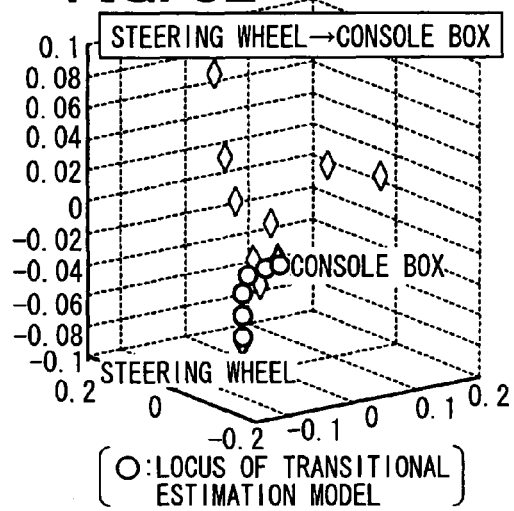

The estimation models are roughly classified into a stationary estimation model and a transitional estimation model. The stationary estimation model is formed from points of an estimated posture (estimated posture points) of the driver who is continuously operating an operational object. The stationary estimation models corresponding to the operational objects are prepared in the memory. The transitional estimation model is formed by an estimated posture locus of the driver who performs an operation (e.g., transitional operation). When the driver performs the transitional operation, the driver switches from an operation on a certain operational object to an operation on another operational object, and the driver is estimated to track a certain posture locus (i.e., estimated posture locus) at this time. A model corresponding to each of the transitional operations is prepared in the memory. FIG. 8A shows a stationary estimation model in an eigenspace simplified to three dimensions. FIGS. 8B to 8E show examples of the transitional estimation model in the eigenspace.

At the time of comparison performed by the operation estimating means 210, first, an angle is calculated. The above angle is formed by each of coordinates (i.e., posture points, that is, coordinates on the eigenspace) in the actual posture locus specified at Step S220 (p01 to p0n; $1 \leq n$) and each of coordinates (p11 to p1m, p21 to p2m, ..., px1 to pxm; $1 \leq m$) on the eigenspace in the estimated posture locus and estimated posture points expressed in estimation models 1 to x ($1<x$) (Step S230).

In such a manner, multiple angle groups (p01[θ11 to θxm], p02[θ11 to θxm], ..., and p0n[θ11 to θxm]) corresponding to the coordinates in the actual posture locus are calculated. The angle θ is calculated by the equation "cos θ=P1·P2/(|P1|·|P2|)" based on the inner product value of the coordinates P1 and P2.

Next, the smallest (minimum) angle among the multiple angles of each of the coordinates calculated at Step S230 is specified, and estimation information on the estimated posture locus or estimated posture point used in the calculation of the smallest angle is specified (Step S240) for each of the coordinates. The "estimation information" refers to information such as an estimation model corresponding to the estimated posture locus or estimated posture point used in the calculation of the minimum angle, a transition direction of each of the coordinates in the estimated posture locus used in the calculation of the minimum angle (the direction from the start point to the end point in the estimated posture locus), and the like. When the minimum angle is smaller, the estimated posture locus or estimated posture point used in the calculation of the minimum angle has the higher order of approximation to the actual posture locus.

After that, a check is made to see whether or not all of the minimum angles specified at Step S240 are less than a predetermined threshold (for example, 20 degrees) (Step S250).

When it is determined at Step S250 that all of the minimum angles are equal to or larger than the predetermined threshold (NO at Step S250), it is estimated that there is no estimation model corresponding to the operation of the driver, that is, any of the operational objects is not performed (Step S260). After that, the process returns to Step S210. At Step S260, a process of turning off of all of the lamps in the lamp group 30 is also performed.

On the other hand, when it is determined at Step S250 that all of the minimum angles are less than the predetermined threshold (YES at Step S250), a check is made to see whether all of the estimation models in the estimation information sets specified at Step S240 are the same or not (Step S270). For example, in other words, a check is made at Step S270 to see whether or not each estimation model in the estimation information specified at Step S240 is identical with each other.

When it is determined at Step S270 that all of the estimation models in the estimation information are not the same (NO at Step S270), the process shifts to Step S260 where it is estimated that an operation on any of the operational objects is not performed. After that, the process returns to Step S210.

On the other hand, when it is determined at Step S270 that all of the estimation models in the estimation information are the same (YES at Step S270), a check is made to see whether the estimation model in the coordinate information specified at Step S240 is a stationary estimation model or not (Step S290).

When it is determined at Step S290 that the estimation model is a stationary estimation model (YES at Step S290), the operation of the driver is estimated on the basis of the estimation models which are determined as the same at Step S270 (Step S300). Then, the process shifts to the following process (Step S310). At Step S300, when the estimation models determined as the same with each other at Step S270 are transitional estimation models, it is estimated on the basis of the combination of operational objects corresponding to the estimation models, that the driver is performing an operation of finishing the operation on a specific operational object and performing an operation on another operational object. On the other hand, when the estimation models determined as the same at Step S270 are stationary estimation models, it is estimated that the driver is operating the operational object corresponding to the estimation models.

When it is determined at Step S290 that the estimation models are transitional estimation models (NO at Step S290), a check is made to see whether all of transition directions in the estimation information specified at Step S240 are the same or not (Step S320). For example, in other words, a check is made at Step S320 whether or not each transition direction in the estimation information specified at Step S240 is identical with each other.

When it is determined at Step S320 that all of the transition directions are not the same (NO at Step S320), the process shifts to Step S260 where it is estimated that the operation on the operational object is not performed. After that, the process returns to Step S210.

On the other hand, when it is determined at Step S320 that all of the transition directions are the same (YES at Step S320), the process shifts to Step S300 where the operation performed by the driver is estimated. After that, the process shifts to the following step (Step S310).

According to the result of estimation at Step S300 by the comparison of the actual posture locus with the estimated posture locus and with the estimated posture point, the operation supporting means 220 supports (e.g., assists) the operation on the operational object (Step S310).

When the result of estimation by the comparison of the actual posture locus is based on the stationary estimation model, the lamp illuminating the operational object corresponding to the stationary estimation model in the lamp group 30 is turned on, and the other lamps are turned off. When the estimation result is based on the transition estimation model, that is, a combination of operational objects, lamp(s) corresponding to one or both of the operational objects (in the present embodiment, only the operational object on the end point side in the transition direction) is/are turned on, and the other lamps are turned off.

Each lamp in the lamp group 30 is turned on by starting energization of the each lamp to be turned on. Also, each lamp is turned off by ending the energization to the each lamp to be turned off.

After the Step S310, the process returns to Step S210.

(2-3) Data Collecting Process

Figure 9:
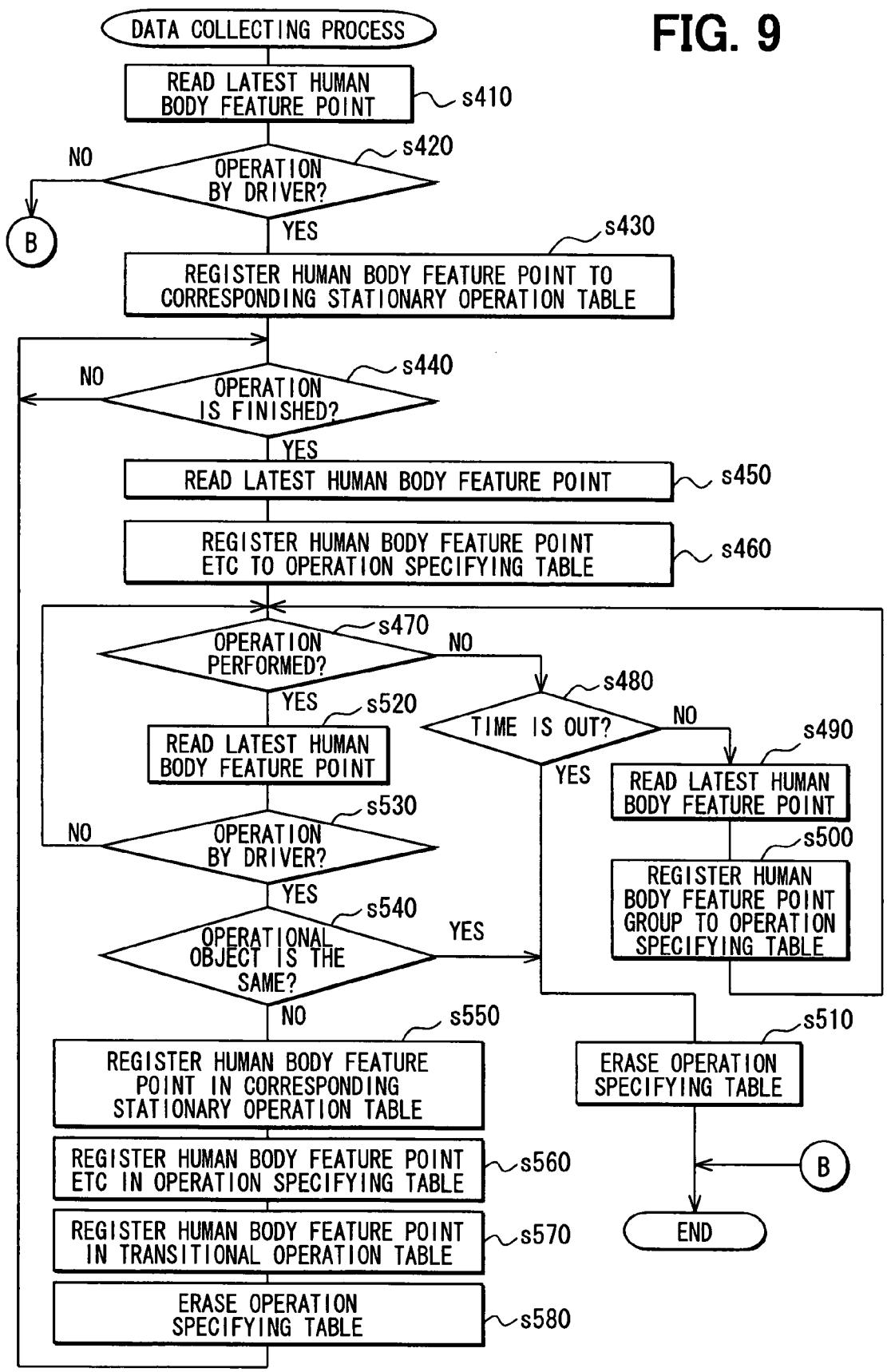
FIG. 9 is a flowchart showing a data collecting process.

Subsequently, the procedure of a data collecting process executed each time an operation on an operational object is detected by the sensor group 70 after the operation estimating apparatus 10 is started will be described with reference to FIG. 9.

The data collecting process is executed by making the microcomputer in the operation estimating apparatus 10 function as a function block constructed by an operation state monitoring means 310, an operator determining means 320, and a locus storing means 330 (refer to FIG. 3). The operation state monitoring means 310 detects that an operation is performed on an operational object prior to start of the data collecting process. The operator determining means 320 determines whether the operation detected by the operation state monitoring means 310 is performed by the driver or not. When the operator determining means 320 determines that the operation is performed by the driver, the locus storing means 330 stores the human body feature points registered in the human body feature point list into predetermined storage areas (a stationary operation table and a transitional operation table which will be described later) in the built-in memory.

When the data collecting process is started, first, the operator determining means 320 reads the latest human body feature point registered in the human body feature point list (Step S410). On the basis of the human body feature point, the operator determining means 320 determines whether the operation performed on the operational object detected prior to the start is performed by the driver or not (Step S420).

Typically, at Step S420, the latest human body feature point that has been registered in the human body feature point list is regarded as a human body feature point corresponding to an operational object detected prior to the start of the data collecting process. In accordance with procedure described below, a check is made to see whether the operation on the operational object is performed by the driver or not (to specify the operator).

Figure 10:
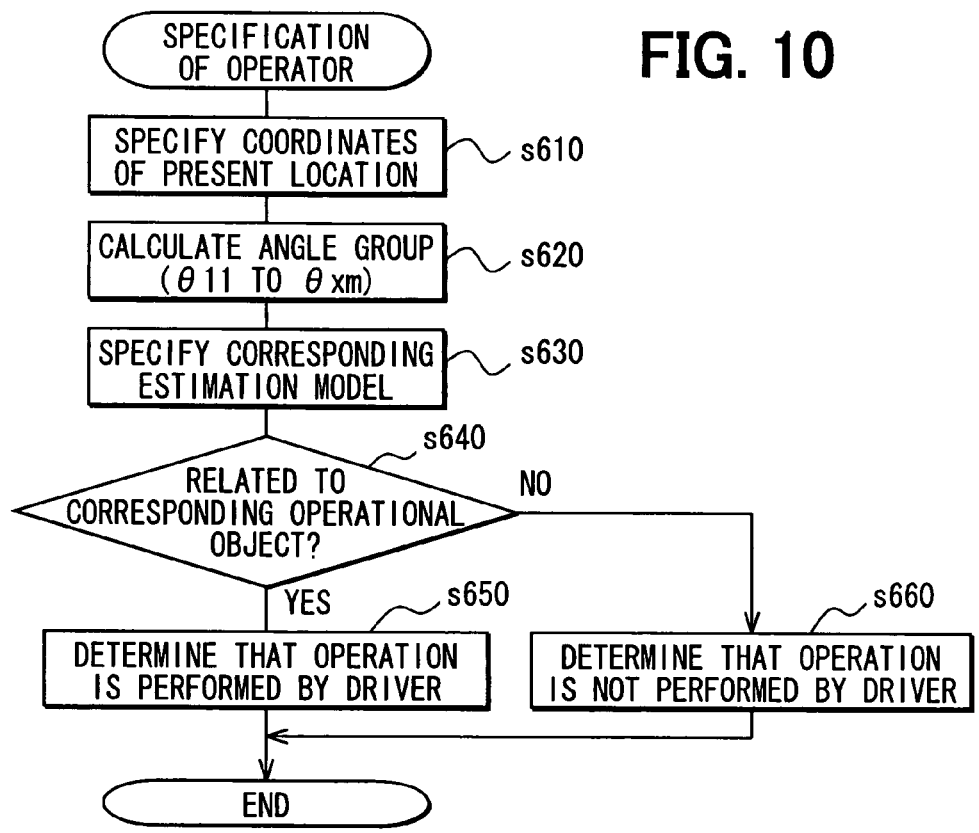
FIG. 10 is a flowchart showing a process for specifying the operator.

As shown in FIG. 10, first, the coordinates on an eigenspace expressed by the principle component analysis in the case of projecting the human body feature point read at Step S410 to the eigenspace are specified (Step S610) The above coordinates are referred as the posture point, more specifically, a posture point in the present location.

Then, the angle is calculated, which is formed between (a) the posture point in the present location specified at Step S610 and (b) each of the coordinates (p11 to p1m, p21 to p2m, . . . , px1 to pxm; 1≦m) on the eigenspace in the estimated posture locus or the estimated posture points shown in each of estimation models 1 to x (Step S620). In such a manner, the angle group (θ11 to θxm) corresponding to the present-location posture point is calculated. The angle θ is calculated by the equation "cos θ=P1·P2/(|P1|·|P2|)" as described above.

Next, an estimation model is specified, which corresponds to the estimated posture locus or the estimated posture point used in the calculation of the smallest (minimum) angle among the angle group calculated at Step S620 (Step S630).

When an operation corresponding to the estimation model specified at Step S630 relates to the operational object on which the operation is detected prior to start of the data collecting process (YES at Step S640), it is determined that the operation on the operational object is performed by the driver (Step S650). When the above operation does not relate to the operational object (NO at Step S640), it is determined that the operation on the operational object is not performed by the driver (Step S660).

When it is determined at Step S420 (Step S610 to Step S660) that the operation on the operational object is not performed by the driver (NO at Step S420), the data collecting process is finished immediately.

On the other hand, when it is determined that the operation on the operational object is performed by the driver (YES at Step S420), the locus storing means 330 registers the human body feature point read at Step S410 in a stationary operation table corresponding to the operational object, the operation performed on which is detected prior to start of the data collecting process (Step S430). Here, the above stationary operation table is selected among from multiple stationary operation tables prepared for the operations.

The stationary operation table is a data table capable of registering a predetermined number of human body feature points at the time an operation on an operational object is performed in the first-in first-out method. The stationary operation tables corresponding to the operational objects are prepared in the memory. That is, in the stationary operation table, after the data collecting process is repeated by predetermined number of times, the predetermined number of human body feature points counted (starting) from the latest one are registered as human body feature points on the corresponding operational object. In the stationary operation table, human feature points expected at the time point when the corresponding operational object is operated may be registered as initial values.

The apparatus enters a standby state until the operation on the operational object, which is detected prior to start of the data collecting process is finished (NO at Step S440). When the sensor for detecting the operation on the corresponding operational object out of the sensor group 70 does not detect the operation, it is determined that the operation is finished.

Then, when it is determined that the corresponding operation is finished (YES at Step S440), the locus storing means 330 reads the latest human body feature point registered in the human body feature point list (Step S450). In this case, the latest human body feature point is read as the human body feature point of the driver at the time of completion of the operation.

The locus storing means 330 generates an operation specifying table for registering human body feature points and specifying an operation. In the operation specifying table, the human body feature point read at Step S450 and the operational object, the operation on which is detected prior to start of the data collecting process, are registered so as to be associated with each other (Step S460). The operation specifying table is a data table for sequentially registering, in time series, human body feature points of the driver after an operation on an operational object is performed.

After that, the operation state monitoring means 310 determines whether an operation is newly performed on an operation object or not (Step S470).

When it is determined at Step S470 that an operation on an operational object is not performed (NO at Step S470), the locus storing means 330 determines whether time that has elapsed since the determination of finishing the operation at Step S440 exceeds a predetermined threshold value (timeout occurs) or not (Step S480).

When it is determined at Step S480 that the lapse time does not exceed the predetermined threshold value (NO at Step S480), the locus storing means 330 reads the latest human body feature point registered in the human body feature point list (Step S490) and registers it into the operation specifying table (Step S500). After that, the process returns to Step S470. In this case, the latest human body feature point that corresponds to the human body feature point of the driver after completion of the operation is read and registered.

On the other hand, when it is determined at Step S480 that the lapse time exceeds the threshold value (YES at Step S480), the locus storing means 330 deletes the operation specifying table generated at Step S460 (Step S510). Then, the data collecting process is finished.

When it is determined at Step S470 that an operation on an operational object is performed (YES at Step S470), the locus storing means 330 reads the latest human body feature point registered in the human body feature point list (Step S520). In a manner similar to the Step S420, the operator determining means 320 determines whether the operation on the operational object, detected prior to the start of the process, is performed by the driver or not on the basis of the human body feature point (Step S530).

When it is determined at Step S530 that the operation on the operational object is not performed by the driver (NO at Step S530), the process returns to Step S470. On the other hand, when it is determined that the operation on the operational object is performed by the driver (YES at Step S530), the locus storing means 330 determines whether the presently operated operational object is the same as the previously operated operational object, the operation on which has been detected to be finished at Step S440 (Step S540).

When it is determined at Step S540 that the operational object is the same (YES at Step S540), the process shifts to Step S510 where the locus storing means erases the operation specifying table. After that, the data collecting process is finished.

On the other hand, when it is determined that the operational object is not the same (NO at Step S540), the locus storing means 330 registers the human body feature points read at Step S520 into a stationary operation table corresponding to the operational object determined to be operated at Step S470 out of the multiple stationary operation tables prepared for the operational objects (Step S550). In this case, the human body feature points read at Step S520 are registered in the stationary operation table as human body feature points of the driver who starts an operation on another operational object.

Subsequently, the locus storing means 330 registers the human body feature points read at Step S520 and the operational object determined to be operated at Step S470 into the operation specifying table generated at Step S460 so as to be associated with each other (Step S560). In this case, the human body feature points read at Step S520 are registered in the operation specifying table as human body feature points of the driver who has started the operation of the another operational object.

The locus storing means 330 registers each of the multiple human body feature points, which have been registered in the operation specifying table at this time point, into a transitional operation table of the operation corresponding to the data registered in the above operation specifying table (Step S570). Here, the above transitional operation table is selected among from multiple transitional operation tables prepared for various operations. The operation specifying table is erased (Step S580) and, after that, the process returns to Step S440.

The transitional operation table is a data table capable of registering the predetermined number of human body feature points by the first-in first-out method. The transitional operation table registers all of the human body feature points at time points during an interval between (a) the end of an operation on a certain operational object and (b) the start of an operation on another operational object as a single data record (human body feature point group). The transitional operation table corresponding to the various operations are prepared in advance in the memory.

Specifically, in the transitional operation table, as a human body feature group made of human body feature points for the corresponding operation, the predetermined number of human body feature points starting from the latest human body feature point are registered. At Step S570, the human body feature points registered in the operation specifying table are registered to the transitional operation table corresponding to a transitional operation starting from the operational object corresponding to the oldest human body feature point to the other operational object corresponding to the latest human body feature point registered in the operation specifying table.

(2-4) Estimation Model Correcting Process

The procedure of the estimation model correcting process, which is repeatedly executed in parallel with the above-described processes since the operation estimation apparatus 10 is started, will be described with reference to FIG. 11.

The estimation model correcting process is executed by making the microcomputer in the operation estimating apparatus 10 function as a functional block made by an estimation model correcting means 410 for correcting (updating) an estimation model stored in the memory to an estimation model generated on the basis of the operation tables (refer to FIG. 3).

When the estimation model correcting process is started, first, the standby state is set until a correction condition to correct an estimation model is satisfied (NO at Step S710). For example, it is determined that the correction condition is satisfied when the operation estimating apparatus 10 starts in association with the start of the vehicle. Also, the correction condition may be satisfied when the predetermined time period has elapsed since an estimation model was updated by the estimation model correcting process. Alternatively, when a predetermined proportion or more of the operation tables has been updated since the estimation model updating was started by the estimation model correcting process. For example, the correction condition may be satisfied when at least one of the above conditions is satisfied.

After that, when it is determined that the correction condition is satisfied (YES at Step S710), the estimation model correcting means 410 reads data registered in the stationary operation table and the transitional operation table (Step S720). In this case, the estimation model correcting means 410 reads (a) a predetermined number of sets of feature points for each of the operational objects registered in the stationary operation table and (b) a predetermined number of sets of the feature point groups for each of the operations registered in the transitional operation table. In the following, the case, in which the estimation model correcting means 410 reads 30 sets of the feature points corresponding to 10 kinds of operational objects registered in the stationary operation tables and 30 sets of the feature point groups corresponding to 9 kinds of operations registered in the transitional operation tables will be described as an example (refer to FIG. 12).

The estimation model correcting means 410 eliminates outliers from the feature points and the feature point groups read at Step S720 (Step S730). With respect to the feature points read from the stationary operation tables, the feature points of a predetermined proportion (for example, 10 sets out of 30 sets), which are generally outliers as compared with the other feature points in the predetermined number of sets of feature points, are removed for each of the operational objects. With respect to the feature point group read from the transitional operation tables, the feature point groups of a predetermined proportion (the same as above), in which each of one or more human body feature points of the human body feature point group is deviated from the corresponding human body feature points in the other feature point groups, is removed as outliers from the predetermined number of sets of the feature point groups for each of the transitional operations.

Then, at Step S740, the estimation model correcting means 410 obtains an eigenspace by applying the principle component analysis to the remaining feature points and feature point groups remained after the removal of the outliers at Step S730.

Typically, the estimation model correcting means 410 projects each of the remaining feature points and feature point groups to the eigenspace obtained at Step S740 for each of the operational objects and the operations. In such a manner, the coordinates and the loci of the coordinates on the eigenspace are specified as actual posture points for the respective operational objects by the driver, and specified as actual posture loci for the transitional operations (Step S750).

Then, at Step S760, the estimation model correcting means 410 calculates an average of the above specified actual posture points (i.e., averaged actual posture points) of each operational object specified at Step S750 as the stationary estimation model corresponding to the operational object. Also, at Step S760, the estimation model correcting means 410 calculates an average of the above specified actual posture loci for each operation specified at Step S750 as the transitional estimation model corresponding to the operation. Specifically, an average value of coordinates as actual posture points is calculated for each of the operational objects. The averaged actual posture point is generated as the stationary estimation model for the operational object. A parametric curve (such as cubic spline curve) is applied to the locus of the coordinates as the actual posture locus for each of the operations, and a sequence of coordinate points obtained in such a manner is generated as the transitional estimation model corresponding to the transitional operation.

At step S770, the estimation model correcting means 410 replaces the prepared estimation models with the estimation models generated correspondingly to the equivalent operation objects and operations of the prepared estimation models at Step S760. In other words, the estimation model correcting means 410 updates the estimation model (Step S770).

After Step S770, the process returns to Step S710 and the standby state is set until the correction condition is satisfied again.

(2-5) Approach Notifying Process

Next, the procedure of an approach notifying process repeatedly executed in parallel with the above-described processes since the operation estimating apparatus 10 has started will be described with reference to FIG. 13.

The approach notifying process is executed by making the microcomputer in the operation estimating apparatus 10 function as a functional block including the operation estimating means 210, an approach detecting means 510 for determining approach of a matter to the vehicle, on which the operation supporting system 1 is mounted by a radar, and a first interruption notifying means 520 for sending a notification on the basis of a result of detection of the approach detecting means 510 and of a result of estimation of the operation estimating means 210 (refer to FIG. 3).

After the approach notifying process is started, first, the approach detecting means 510 determines whether there is a matter approaching the vehicle or not on the basis of the radar (Step S810).

The apparatus is in the standby state when it is determined at Step S810 that a matter is not approaching the vehicle (NO at Step S810). When it is determined that a matter is approaching the vehicle (YES at Step S810), the first interruption notifying means 520 determines whether or not it is a dangerous state such that the driver is not aware of the approach of the matter (Step S820). In the present embodiment, the first interruption notifying means 520 monitors the result of estimation of the operation estimating means 210 to determine a dangerous state when the result shows that an operational object other than the steering wheel 84 and the shift lever 60 is operated.

When the dangerous state is not determined at Step S820 (NO at Step S820), the process returns to Step S810. On the other hand, when the dangerous state is determined (YES at Step S820), the first interruption notifying means 520 notifies of the dangerous state (Step S830), and the process returns to Step S810. At Step S830, the notification is realized by outputting a message indicating that the driver is not aware of the approach of the matter, and thereby it is dangerous through the speaker or the display of the navigation apparatus 40.

The message to be output is not limited to the message indicating that the matter (e.g., object) is approaching. When the result of estimation of the operation estimating means 210 is based on the stationary estimation model, a message, which indicates that the driver should stop the operation on the operational object and drive the vehicle safely, may be output. In contrast, when the result of estimation of the operation estimating means 210 is based on the transitional estimation model, a message, which indicates that the driver should stop the operation on the operational object at the end point of the posture locus in the operation and drive the vehicle safely, may be output.

(2-6) Start Notifying Process

Subsequently, the procedure of a start notifying process repeatedly executed in parallel with the above-described processes since the operation estimating apparatus 10 has started will be described with reference to FIG. 14.

The start notifying process is executed by making the microcomputer in the operation estimating apparatus 10 function as a function block including the above-described operation estimating means 210, a traffic information obtaining means 610 for obtaining traffic information, a travel state detecting means 620 for detecting a travel state of the vehicle, and a second interruption notifying means 630 for sending a notification on the basis of the traffic information obtained by the traffic information obtaining means 610, of the travel state detected by the travel state detecting means 62, and of the result of estimation of the operation estimating means 210 (refer to FIG. 3).

When the start notifying process is started, first, the travel state detecting means 620 determines whether the vehicle stops or not on the basis of an output from a sensor capable of detecting travel speed in the sensor group 70 (Step S910). In the present embodiment, it is determined that the vehicle stops when the travel speed detected by the sensor is less than a predetermined value (for example, 5 km/h).

The apparatus is in a standby mode when it is determined at Step S910 that the vehicle does not stop (NO at Step S910). When it is determined that the vehicle stops (YES at Step S910), the traffic information obtaining means 610 obtains traffic information from the outside of the vehicle (e.g., from an apparatus mounted on a road and other vehicles) (Step S920). In the present case, traffic information indicative of traffic conditions is obtained via a communication function of the navigation apparatus 40. The traffic conditions include whether or not a junction having a traffic signal exists ahead of the vehicle, the display state of the signal (green or red) in the travel direction of the vehicle, whether or not a crossing exists ahead of the vehicle, and the open/close state of the crossing bar of the crossing.

Subsequently, the second interruption notifying means 630 determines whether the vehicle should start or not on the basis of the traffic information obtained at Step S920 (Step S930). It is determined that the vehicle should start when the traffic information obtained at Step S920 shows that a junction exists and the traffic signal is "green" or that a crossing exists and the crossing bar is "open."

When it is determined at Step S930 that the vehicle should not start on the basis of the traffic conditions (NO at Step S930), the travel state determining means 620 determines whether the vehicle has started traveling on the basis of an output from the sensor capable of sending the travel speed in the sensor group 70 (Step S940). At Step S940, when the travel speed detected by the sensor is equal to or larger than the predetermined value (for example, 5 km/h), it is determined that the vehicle has started traveling.

When it is determined at Step S940 that the vehicle has started traveling (YES at Step S940), the process returns to Step S910. On the other hand, when it is determined that the vehicle has not started traveling (NO at Step S940), the process returns to Step S920.

When it is determined at Step S930 on the basis of the traffic conditions that the vehicle should start (YES at Step S930), similar to in the Step S940, the travel state detecting means 620 determines whether the vehicle has started traveling or not on the basis of the output from the sensor capable of detecting the travel speed in the sensor group 70 (Step S950).

When it is determined at S950 that the vehicle has started traveling (YES at Step S950), the process returns to S910. On the other hand, when it is determined that the vehicle has not started traveling (NO at Step S950), a check is made to see whether predetermined time (for example, 1 second) has elapsed since the traffic information was obtained at Step S920 or not (Step S960).

When the predetermined time has not elapsed at Step S960 (NO at Step S960), the process returns to Step S930. On the other hand, when the predetermined time has elapsed (YES at Step S960), the second interruption notifying means 630 checks whether an operation on the operational object is a cause of delay in the start or not (Step S970). In the embodiment, the second interruption notifying means 630 monitors a result of estimation of the operation estimating means 210. When it is monitored that an operational object other than the steering wheel 84 or the shift lever 60 is operated, it is determined that the cause of the delay in start is the operation on the operational object.

When it is determined at Step S970 that the cause of the delay in start is the operation on the operational object (YES at Step S970), the second interruption notifying means 630 notifies of the above state (Step S980) and the process returns to Step S910. At Step S980, notification is realized by outputting a message indicating that the start delays due to the operation on the operational object through the speaker or the display of the navigation apparatus 40.

As the above output message, a message indicating that the signal shows "green", and thereby the vehicle should start may be output. alternatively, when the result of estimation of the operation estimating means 210 is based on the stationary estimation model, a message that the driver should stop the operation on the operational object and start the vehicle safely may be output. In contrast, when the estimation result of the operation estimating means 210 is based on the transitional estimation model, a message to interrupt the operation on the operational object at the end point of the posture locus in the corresponding operation and start the vehicle safely may be output, alternatively.

On the other hand, when it is determined that the operation on the operational object is not the cause of the delay in start (NO at Step S970), without performing Step S980, the process returns to Step S910.

(3) Advantages

In the operation support system 1 constructed as described above, the operation estimating apparatus 10 compares the actual posture locus of the driver with each of estimated posture loci in the transitional estimation models and each of estimated posture points in stationary estimation models (Step S220 to Step S270 in FIG. 7) and, when there is an estimated posture locus having a degree of approximation that satisfies a predetermined threshold value, the operation estimating apparatus 10 can estimate that the driver is going to operate the operational object. Further, the operation estimating apparatus 10 can estimate that the driver is going to perform an certain operation corresponding to the estimated posture locus or the estimated posture points that satisfies the condition of the degree of approximation (Step S300 in FIG. 7).

Figure 7:
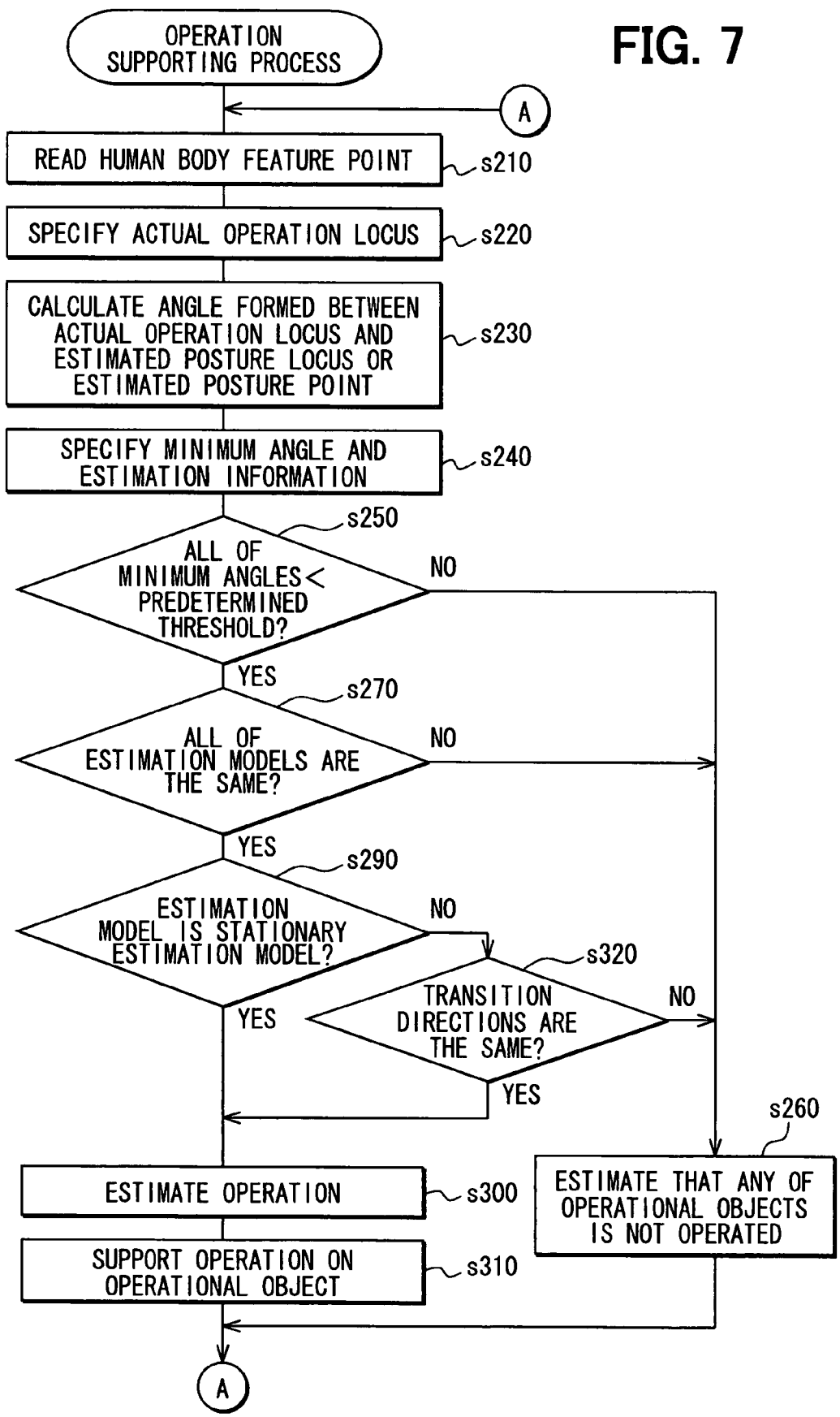
FIG. 7 is a flowchart showing an operation supporting process.

Further, by the operation supporting means 220, the operation on the operational object to be operated in the estimated operation can be supported (assisted) ahead of time, or the operation performed by the driver can be continuously supported (Step S310 in FIG. 7). Consequently, execution of the operation can be facilitated.

Support of the operation on the operational object is realized by turning on a lamp corresponding to the operational object to illuminate the operational object to be operated. Since the operational object to be operated by the driver is illuminated by the lamp, the position of the operational object can be easily visually recognized. As a result, a hand or the like of the driver can be guided to the position of the operational object visually.

Figure 13:
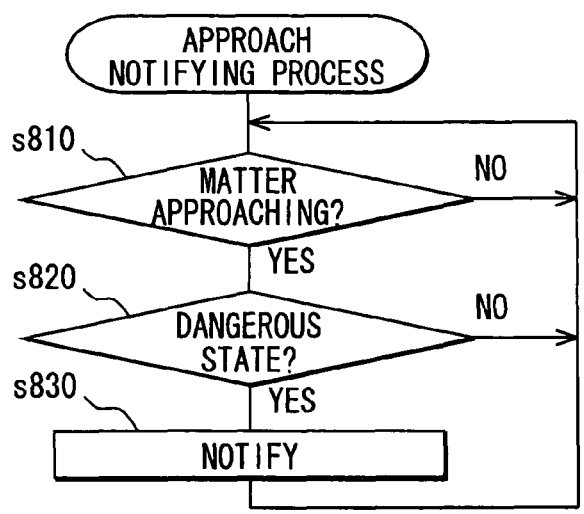
FIG. 13 is a flowchart showing an approach notifying process.

In the above configuration, when a matter is approaching the vehicle ("YES" at Step S810 in FIG. 3) in a state, where an operational object other than the steering wheel and the shift lever is operated ("YES" at Step S820 in FIG. 13), a message for stopping the operation on the operational object can be notified (Step S830 in FIG. 13). Consequently, even when the driver concentrates on an operation on the operational object, because of the notification, the driver becomes aware of the existence of the approaching matter, and thereby can drive so as to avoid collision with the matter.

Figure 14:
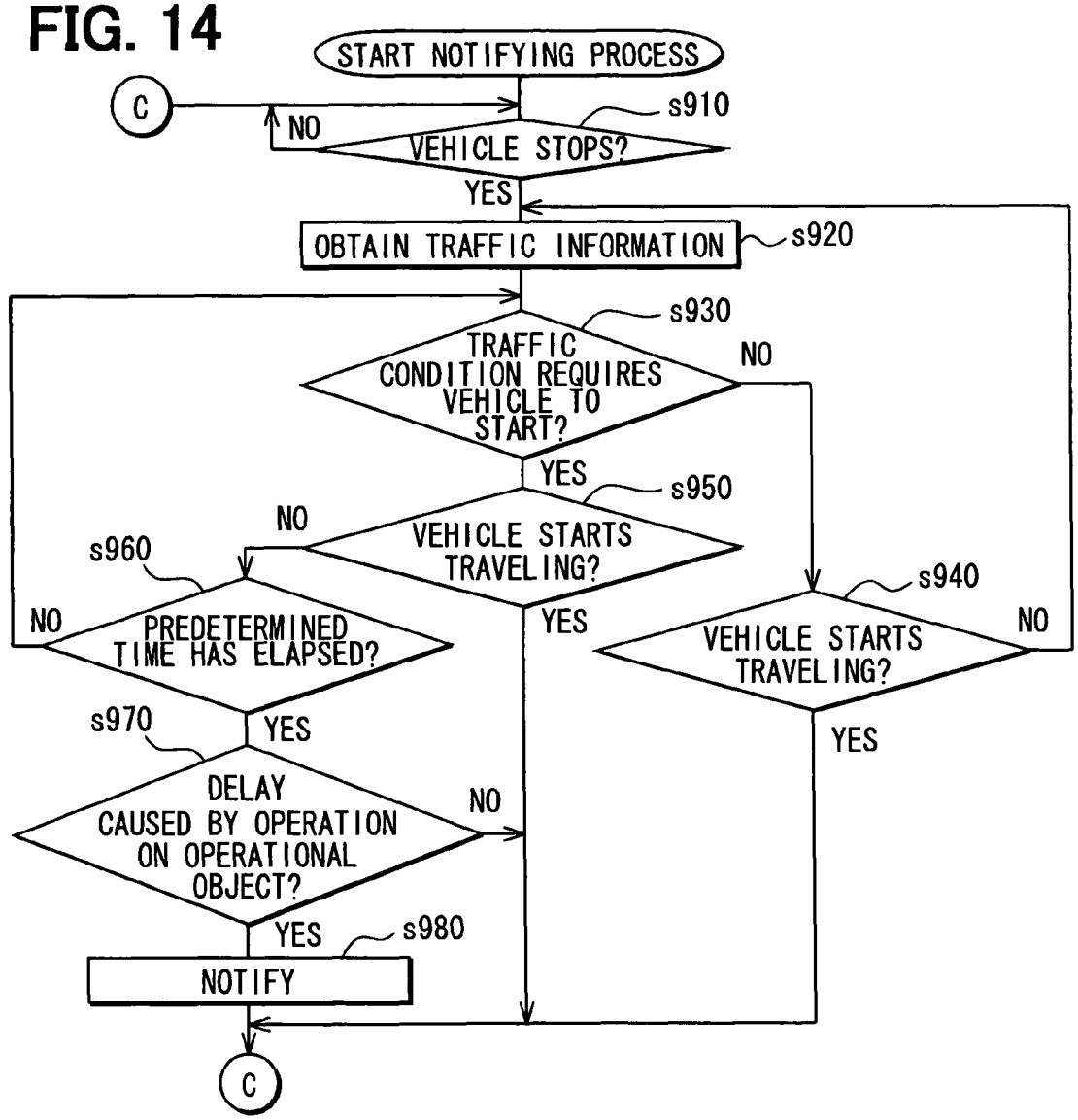
FIG. 14 is a flowchart showing a start notifying process.

With such a configuration, when the vehicle should be started under the traffic conditions ("YES" at Step S930 in FIG. 14) in a state where an operational object other than the steering wheel and the shift lever is going to be operated or is being operated ("YES" at Step S970 in FIG. 14), the message for stopping the operation on the operational object can be notified (Step S980 in FIG. 14). Consequently, even when the driver concentrates on the operation on the operational object, the notification makes the driver aware of the traffic conditions, and thereby stop the operation on the operational object, to start the vehicle. Thus, the vehicle can be limited from obstructing the traffic.

In the above-described configuration, the operation estimating means 210 reads the estimation models stored in the memory (Step S230 in FIG. 7) and compares the actual posture locus with each of the read estimation models. The estimation models are stored in the memory as above, and the comparison of the actual posture locus with each of the stored estimation models, which are read from the memory, can be realized.

Figure 11:
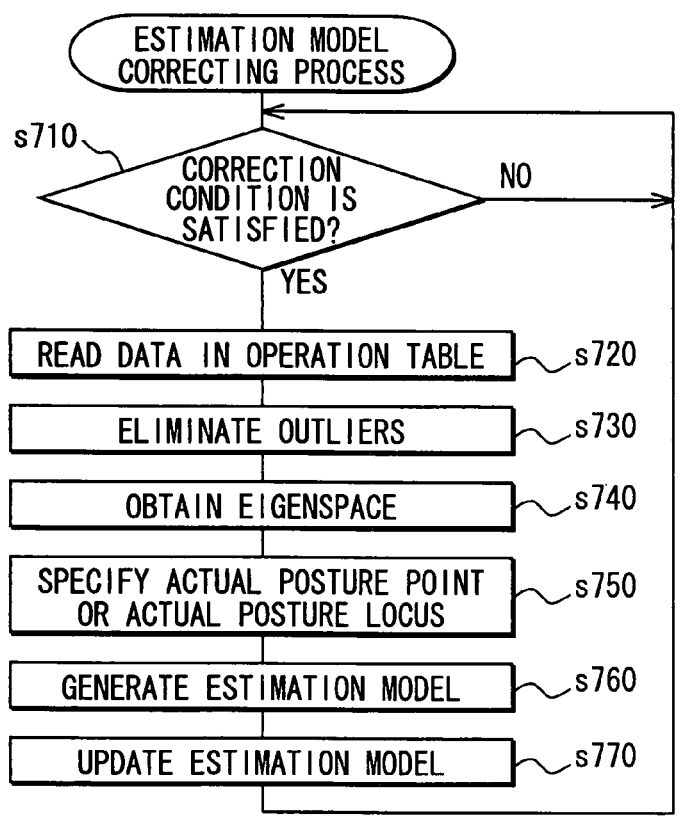
FIG. 11 is a flowchart showing an estimated model correcting process.

In the configuration, on the basis of human body feature points at the time when the driver continuously operates a specific operational object, the stationary estimation model corresponding to the operation can be corrected (Step S720 to Step S770 in FIG. 11). The stationary estimation model is corrected to a model in which the tendency of the posture loci in the operator is reflected. As a result, the stationary estimation model adapted to the operator can be obtained. This becomes more remarkable as the same operation is repeatedly performed on the operator.

By storing the human body feature points, which are specified by the human body feature point specifying means 120 at the time when the operational object is operated into the storage (Steps S430 and S550 in FIG. 9), the stationary estimation model can be corrected at a predetermined timing on the basis of the actual posture locus obtained from the stored human body feature points ("YES" at Step S710 in FIG. 11).

By updating (overwriting) the stationary estimation model corresponding to the operated operational object by using an estimation model obtained by averaging the predetermined number of actual posture points obtained from the human body feature points stored in the storage, the stationary estimation model can be corrected (Step S720 to Step S770 in FIG. 11).

In the configuration, when the driver finishes operating a certain operational object and starts operating another operational object, a transitional estimation model corresponding to the transitional operation can be corrected based on the actual posture locus obtained based on the human body feature points specified in the transitional operation (Step S720 to Step S770 in FIG. 11). The transitional estimation model is corrected into a model in which the tendency of the posture loci in the operator is reflected. As a result, the transitional estimation model adapted to the operator can be obtained. This becomes more remarkable as the same operation is repeatedly performed on the operator.

By storing human body feature point groups in the transition between the end of operation on a certain operational object and start of operation on another operational object into the storage (Steps S460, S500, S560, and S570 in FIG. 9), a transitional estimation model can be corrected at a predetermined timing on the basis of the actual posture loci obtained from the stored human body feature point groups ("YES" at Step S710 in FIG. 11).

The transitional estimation model can be corrected by updating (overwriting) the transitional estimation model corresponding to the transition between the end of operation on a certain operational object and the start of operation on another operational object by using an estimation model obtained by averaging the predetermined number of actual posture loci obtained from the human body feature point groups stored in the storage (Step S720 to Step S770 in FIG. 11).

(4) Modifications

Although the embodiments of the present invention have been described above, obviously, the present invention is not limited to the above embodiments but can be variously modified within the technical scope of the present invention.

For example, in the above embodiments, the operation estimating apparatus 10 of the present invention is mounted on a vehicle. Obviously, the vehicle of the operation estimating apparatus include not only an automobile, but also an airplane or a motorcycle that requires the driver to drive the vehicle. Also, the operation estimating apparatus 10 can be applied to a machine tool requiring an operation by the operator.

In the above embodiments, as the camera 20 capturing images of the interior of the vehicle, any camera can be used provided that it can capture images including human body feature points which can be specified by the human body feature point specifying means 120. For example, a black-and-white camera, a color camera, a stereo camera (made of multiple camera units) for obtaining a stereoscopic image as human body feature points, a three-dimensional image sensor (a sensor for outputting distance on the basis of components of pixels), or the like can be used. In the case of using a stereo camera or a three-dimensional image sensor, the human body feature point specifying means 120 may specify three-dimensional coordinates as human body feature points.

In the foregoing embodiments, the operation estimating means 210 determines whether or not all of estimation models corresponding to one or more estimated posture loci (at least one estimated posture locus) having a high degree of approximation specified by comparison of the actual posture locus are identical with each other. Only when all of the estimation models are the same ("YES" at Step S270 in FIG. 7), it is estimated that the driver is going to perform an operation corresponding to the identical estimation models (Step S270 to Step S300 in FIG. 7).

Alternatively, the operation estimating means 210 may estimate that the driver is going to perform an operation for an estimation model that corresponds to the estimated posture locus having the maximum or minimum degree of approximation among one or more estimation posture loci having a high degree of approximation. For this purpose, when it is determined as "YES" at Step S250 in FIG. 7, the process may be shifted to Step S290 without performing Step S270 such that the operation estimating means 210 estimates that the driver is going to perform an operation corresponding to the estimated posture locus having the maximum degree of approximation (the minimum angle).

In the foregoing embodiments, by turning on a lamp corresponding to an operational object, the operation supporting means 220 supports the operation on the operational object (Step S310 in FIG. 7). The support of the operation may be also realized by making the brightness of the corresponding lamp higher than that of the other lamps.

In the embodiments, by turning on a lamp corresponding to an operational object, the operation supporting means 220 supports the operation on the operational object (Step S310 in FIG. 7). A specific configuration for supporting an operation on an operational object is not limited to the above-described configuration.

For example, when a changing mechanism capable of changing the direction of an operational object is provided for each of one or more operational objects, the following configuration may be employed. The changing mechanism for an operational object corresponding to a result of estimation of the operation estimating means 210 is controlled such that the direction of the operational object is changed toward the operator, thereby supporting the operation of the operator. In this case, "the lamp" in the above description will be read as "the changing mechanism" and "turn on/off the lamp" will be read as "change/reset the direction of the operational object."

With the configuration, the direction of the operational object corresponding to the result of estimation can be set toward the operator, so that the operational object can be operated more easily.

Another configuration may be employed when a vibration mechanism capable of vibrating a part or all of the operational object is provided for each of one or more operational objects. Specifically, the vibration mechanism corresponding to an operational object to be operated in an operation estimated by the operation estimating means 210 is controlled such that a part or all of the operational object vibrates. By making the operator recognize the position of the operational object tactually, the operation is supported. In this case, "the lamp" in the above description will be read as "the vibration mechanism" and "turn on/off the lamp" will be read as "start/finish the vibration of the operational object."

In the configuration, a part or all of the operational object the operator is going to operate vibrates, so that the operator can recognize the position of the operational object by the vibration. As a result, a hand or the like of the operator can be guided to the position of the operational object.

When the multiple operational objects include enclosing operational objects (for example, the glove box 94 and the console box 96) capable of enclosing a matter by opening/closing a cover and the enclosing operational object has an opening/closing mechanism for opening/closing the cover, the following configuration may be employed.

When an operational object to be operated in the operation estimated by the operation estimating means 210 is an enclosing operational object, by controlling the opening/closing mechanism in the enclosing operational object to open the cover, the operation is supported. In this case, "the lamp" in the above description will be read as "the opening/closing mechanism" and "turn on/off the lamp" will be read as "open/close the cover of the enclosing operational object."

In the configuration, when the driver is going to operate the enclosing operational object, the cover of the enclosing operation object can be opened ahead of time. Consequently, a part of an operation of enclosing a matter into the operational object or of an operation of taking the matter from the operational object can be omitted.

Particularly, in the configuration, when the operational object corresponding to a result of estimation by the operation estimating means 210 is not the enclosing operational object and the cover of the enclosing operational object is already open, the operation supporting member 220 controls the opening/closing mechanism in the enclosing operational object to close the cover. Typically, at Step S310 in FIG. 7 (a case, where the operational object is not an enclosing operational object) and Step S260 in FIG. 7, the opening/closing mechanism is controlled to close the cover.

With such a configuration, either when the driver is going to perform an operation on another operational object or when the operator is not going to perform an operation on the another operational object in a state where the cover of the enclosing operational object is open, the cover of the enclosing operational object can be automatically closed.

In the configuration, at Step S980 in FIG. 14, notification is realized by outputting a message indicating that the start delays due to the operation on the operational object through the speaker or the display. The notification may be also realized by another method, for example, of turning on a lamp or driving a predetermined actuator.

In the foregoing embodiments, each of the stationary operation table and the transitional operation table is constructed as a data table capable of registering data only by a predetermined number in the first-in first-out method. The operation tables may be constructed as data tables capable of registering data without setting an upper limit. For example, data in the operation tables may be cleared at any time or a predetermined time).

In the embodiments, the estimation model correcting means 410 extracts the predetermined number of human body feature points and the human body feature point groups by excluding the outliers from the stationary operation table and the transitional operation table, and then, corrects the estimation table (Steps S730 to S770 in FIG. 11). In this case, the human body feature points and the human body feature point groups are registered to the operation tables each time a predetermined operation is performed. Consequently, when the correction condition is satisfied in a state where the operation is not performed by the sufficient number of times, the predetermined number of human body feature points and human body feature point groups to be essentially used for correction cannot be extracted.

In this case, the estimation model correcting means 410 may correct an estimation model on the basis of the human body feature points and the human body feature point groups of the number less than the predetermined number. It is also possible to make up the shortfall using prepared human body feature points or human body feature point groups to correct the model.

As a configuration for the latter case, for example, in addition to the operation tables in which registered data is always updated, a static operation table in which human body feature points and human body feature point groups as fixed values may be prepared for operations. When the number of the human body feature points and the human body feature point groups are short at the time of extraction for a certain operation, the estimation model correcting means 410 may compensate the shortage from the human body feature points and the human body feature point groups for the certain operation from the static operation table and realize correction of the estimation table.

With such a configuration, even at a stage before the predetermined number of human feature points or human body feature point groups to be used for correction are stored into the storage, the estimation model can be corrected on the basis of the predetermined number of human body feature points or human body feature point groups.

In the embodiment, the operation of the driver existing in the driver's seat in the vehicle is estimated. It is also possible to estimate the operation of an operator existing in an alternative one of other seats (for example, passenger's seat) other than the driver's seat in the vehicle. In the alternative case, the camera 20 is mounted to capture the images of the above operator in the alternative one of the other seats. At Steps S420 and S530 in FIG. 9, a check is made to see whether the operation is performed by the operator seated in the alternative one or not.

It is also possible to estimate the operation by not only the operator but also by the driver simultaneously. In this case, one or more cameras 20 are mounted in positions to capture images of the operator and the driver. At Steps S420 and S530 in FIG. 9, a check is made to see whether the operation is performed by one of the driver and the operator.

In particular, in the configuration, notification at Step 830 in FIG. 13 and Step S980 in FIG. 14 is performed only when it is estimated that the operation is performed by the driver.

Additional advantages and modifications will readily occur to those skilled in the art. The invention in its broader terms is therefore not limited to the specific details, representative apparatus, and illustrative examples shown and described.

What is claimed is:

1. An operation estimating apparatus comprising:
   an image obtaining means for repeatedly obtaining images, each of the images having a plurality of operational objects and an operator that is positioned to be able to perform operations on the plurality of operational objects;
   a human body feature point specifying means for specifying a predetermined human body feature point of the operator in each of the images that are repeatedly obtained by the image obtaining means; and
   an operation estimating means for estimating one of the operations, which the operator is going to perform, based on the human body feature points specified by the human body feature point specifying means in the images, wherein:
   the operation estimating means compares an actual posture locus of the operator with a transitional estimation model for each of the operations by the operator to obtain a degree of approximation of the transitional estimation model to the actual posture locus, the transitional estimation model for the each of the operations being formed based on an estimated posture locus of the each of the operations, the operator being estimated to track the estimated posture locus to operate one of the plurality of operational objects that corresponds to the estimated posture locus, the actual posture locus of the operator being obtained based on the human body feature points specified by the human body feature point specifying means in the images;

the operation estimating means estimates that the operator is going to perform the one of the operations that corresponds to the estimated posture locus of the transitional estimation model having the degree of approximation that satisfies a predetermined threshold;

the operation estimating means compares the actual posture locus with (a) the transitional estimation model for the each of the operations, and with (b) a stationary estimation model for each of the plurality of operational objects to obtain the degree of approximation of the transitional estimation model to the actual posture locus and a degree of approximation of the stationary estimation model to the actual posture locus, the stationary estimation model for the each of the plurality of operational objects being formed based on an estimated posture point of the operator, the operator being estimated to take the estimated posture point to continuously operate one of the plurality of operational objects that corresponds to the estimated posture point; and the operation estimating means estimates either:
(a) that the operator is going to perform the one of the operations that corresponds to the estimated posture locus of the transitional estimation model having the degree of approximation that satisfies a predetermined threshold; or
(b) that the operator is operating the one of the plurality of operational objects that corresponds to the estimated posture point of the stationary estimation model having the degree of approximation that satisfies a predetermined threshold.

2. The operation estimating apparatus according to claim 1, further comprising:
an operation supporting means for supporting the operation on a corresponding one of the plurality of operational objects that corresponds to a result of estimation by the operation estimating means.

3. The operation estimating apparatus according to claim 2, wherein:
the operation supporting means turns on a lamp adapted for illuminating the corresponding one of the plurality of operational objects that corresponds to the result of estimation by the operation estimating means such that the operation supporting means illuminates the corresponding one of the plurality of operational objects.

4. The operation estimating apparatus according to claim 2, wherein:
the plurality of operational objects includes an enclosing operational object, which has a cover, and which encloses a matter by opening and closing the cover, the enclosing operational object having an opening/closing mechanism that opens and closes the cover; and
the operation supporting means controls the opening/closing mechanism of the enclosing operational object to open the cover such that the operation supporting means supports the operation on the enclosing operational object when the corresponding one of the plurality of operational objects that corresponds to the result of estimation by the operation estimating means is the enclosing operational object.

5. The operation estimating apparatus according to claim 1, wherein:
the operation estimating apparatus is mounted on a vehicle;
the plurality of operational objects includes at least one operational object of the vehicle; and
the operator exists in a seat of the vehicle.

6. The operation estimating apparatus according to claim 1, wherein the operation estimating means reads the transitional estimation model for the each of the operations stored in a storage, and compares the actual posture locus with the read transitional estimation model for the each of the operations.

7. The operation estimating apparatus according to claim 1, wherein the operation estimating means reads the stationary estimation model for the each of the plurality of operational objects stored in a storage, and compares the actual posture locus with the read stationary estimation model for the each of the plurality of operational objects.

8. An article of manufacture comprising: a non-transitory computer readable medium readable by a computer system; and program instructions carried by the non-transitory computer readable medium for causing the computer system to execute various procedures as all elements of the operation estimating apparatus according to claim 1.

9. An operation estimating apparatus comprising:
an image obtaining means for repeatedly obtaining images, each of the images having a plurality of operational objects and an operator that is positioned to be able to perform operations on the plurality of operational objects;
a human body feature point specifying means for specifying a predetermined human body feature point of the operator in each of the images that are repeatedly obtained by the image obtaining means;
an operation estimating means for estimating one of the operations, which the operator is going to perform, based on the human body feature points specified by the human body feature point specifying means in the images; and
an operation supporting means for supporting the operation on a corresponding one of the plurality of operational objects that corresponds to a result of estimation by the operation estimating means, wherein:
the operation estimating means compares an actual posture locus of the operator with a transitional estimation model for each of the operations by the operator to obtain a degree of approximation of the transitional estimation model to the actual posture locus, the transitional estimation model for the each of the operations being formed based on an estimated posture locus of the each of the operations, the operator being estimated to track the estimated posture locus to operate one of the plurality of operational objects that corresponds to the estimated posture locus, the actual posture locus of the operator being obtained based on the human body feature points specified by the human body feature point specifying means in the images;
the operation estimating means estimates that the operator is going to perform the one of the operations that corresponds to the estimated posture locus of the transitional estimation model having the degree of approximation that satisfies a predetermined threshold;
the plurality of operational objects includes an enclosing operational object, which has a cover, and which encloses a matter by opening and closing the cover, the enclosing operational object having an opening/closing mechanism that opens and closes the cover; and
the operation supporting means controls the opening/closing mechanism of the enclosing operational object to open the cover such that the operation supporting means supports the operation on the enclosing operational object when the corresponding one of the plurality of operational objects that corresponds to the result of estimation by the operation estimating means is the enclosing operational object; and the operation supporting means controls the opening/closing mechanism of the enclosing operational object to close the cover when the corresponding one of the plurality of operational objects that corresponds to the result of estimation by the operation estimating means is different from the enclosing operational object and simultaneously when the cover of the enclosing operational object has already been opened.

10. An operation estimating apparatus comprising:

an image obtaining means for repeatedly obtaining images, each of the images having a plurality of operational objects and an operator that is positioned to be able to perform operations on the plurality of operational objects;

a human body feature point specifying means for specifying a predetermined human body feature point of the operator in each of the images that are repeatedly obtained by the image obtaining means;

an operation estimating means for estimating one of the operations, which the operator is going to perform, based on the human body feature points specified by the human body feature point specifying means in the images;

an approach detecting means for determining whether or not there is a matter that relatively approaches the vehicle; and a first interruption notifying means for sending a notification to stop operating the corresponding one of the plurality of operational objects when the approach detecting means determines that the matter approaches the vehicle in a case, where the corresponding one of the plurality of operational objects that corresponds to the result of estimation by the operation estimating means is different from the steering wheel and the shift lever, wherein:

the operation estimating means compares an actual posture locus of the operator with a transitional estimation model for each of the operations by the operator to obtain a degree of approximation of the transitional estimation model to the actual posture locus, the transitional estimation model for the each of the operations being formed based on an estimated posture locus of the each of the operations, the operator being estimated to track the estimated posture locus to operate one of the plurality of operational objects that corresponds to the estimated posture locus, the actual posture locus of the operator being obtained based on the human body feature points specified by the human body feature point specifying means in the images;

the operation estimating means estimates that the operator is going to perform the one of the operations that corresponds to the estimated posture locus of the transitional estimation model having the degree of approximation that satisfies a predetermined threshold the operation estimating apparatus is mounted on a vehicle;

the plurality of operational objects includes at least one operational object of the vehicle;

the operator exists in a seat of the vehicle; and the at least one operational object includes a steering wheel and a shift lever of the vehicle.

11. An operation estimating apparatus comprising:

an image obtaining means for repeatedly obtaining images, each of the images having a plurality of operational objects and an operator that is positioned to be able to perform operations on the plurality of operational objects;

a human body feature point specifying means for specifying a predetermined human body feature point of the operator in each of the images that are repeatedly obtained by the image obtaining means; and an operation estimating means for estimating one of the operations, which the operator is going to perform, based on the human body feature points specified by the human body feature point specifying means in the images;

a travel state detecting means for detecting a travel state of the vehicle;

a traffic information obtaining means for obtaining information about a traffic condition around the vehicle; and a second interruption notifying means for sending a notification to stop operating the corresponding one of the plurality of operational objects when the travel state detected by the travel state detecting means indicates that the vehicle stops and simultaneously when the information obtained by the traffic information obtaining means indicates the traffic condition that requires the vehicle to start in a case, where the corresponding one of the plurality of operational objects that corresponds to the result of estimation by the operation estimating means is different from the steering wheel and the shift lever, wherein:

the operation estimating means compares an actual posture locus of the operator with a transitional estimation model for each of the operations by the operator to obtain a degree of approximation of the transitional estimation model to the actual posture locus, the transitional estimation model for the each of the operations being formed based on an estimated posture locus of the each of the operations, the operator being estimated to track the estimated posture locus to operate one of the plurality of operational objects that corresponds to the estimated posture locus, the actual posture locus of the operator being obtained based on the human body feature points specified by the human body feature point specifying means in the images;

the operation estimating means estimates that the operator is going to perform the one of the operations that corresponds to the estimated posture locus of the transitional estimation model having the degree of approximation that satisfies a predetermined threshold;

the operation estimating apparatus is mounted on a vehicle;

the plurality of operational objects includes at least one operational object of the vehicle;

the operator exists in a seat of the vehicle; and the at least one operational object includes a steering wheel and a shift lever of the vehicle.

12. An operation estimating apparatus comprising:

an image obtaining means for repeatedly obtaining images, each of the images having a plurality of operational objects and an operator that is positioned to be able to perform operations on the plurality of operational objects;

a human body feature point specifying means for specifying a predetermined human body feature point of the operator in each of the images that are repeatedly obtained by the image obtaining means;

an operation estimating means for estimating one of the operations, which the operator is going to perform, based on the human body feature points specified by the human body feature point specifying means in the images;

an operation state monitoring means for detecting an operational state of at least one of the plurality of operational objects to determine that the at least one of the plurality of operational objects is operated; and a stationary estimation model correcting means for correcting a stationary estimation model that corresponds to the at least one of the plurality of operational objects in accordance with an actual posture point at a time when the operation state monitoring means determines that the at least one of the plurality of operational objects is operated, the actual posture point being obtained based on the human body feature point specified by the human body feature point specifying means, the stationary estimation model being formed based on an estimated posture point of the operator, the operator being estimated to take the estimated posture point to continuously operate the at least one of the plurality of operational objects, wherein:

the operation estimating means compares an actual posture locus of the operator with a transitional estimation model for each of the operations by the operator to obtain a degree of approximation of the transitional estimation model to the actual posture locus, the transitional estimation model for the each of the operations being formed based on an estimated posture locus of the each of the operations, the operator being estimated to track the estimated posture locus to operate one of the plurality of operational objects that corresponds to the estimated posture locus, the actual posture locus of the operator being obtained based on the human body feature points specified by the human body feature point specifying means in the images; and the operation estimating means estimates that the operator is going to perform the one of the operations that corresponds to the estimated posture locus of the transitional estimation model having the degree of approximation that satisfies a predetermined threshold.

13. The operation estimating apparatus according to claim 12, further comprising:

a stationary point storing means for storing the human body feature point into the storage every time the operation state monitoring means determines that the at least one of the plurality of operational objects is operated such that the stationary point storing means stores a plurality of human body feature points in the storage, the human body feature point being specified by the human body feature point specifying means at a time, when the operation state monitoring means determines that the at least one of the plurality of operational objects is operated, wherein:

the stationary estimation model correcting means corrects the stationary estimation model that corresponds to the at least one of the plurality of operational objects based on the plurality of human body feature points stored in the storage when a predetermined correction condition is satisfied.

14. The operation estimating apparatus according to claim 13, wherein:

the stationary estimation model correcting means calculates an averaged actual posture point based on a predetermined number of actual posture points, each of which is obtained based on a corresponding one of the plurality of human body feature points stored in the storage by the stationary point storing means; and the stationary estimation model correcting means updates the stationary estimation model, which corresponds to the at least one of the plurality of operational objects, to make the stationary estimation model into an estimation model, which is formed by the averaged actual posture point.

15. The operation estimating apparatus according to claim 14, wherein:

when a number of the plurality of human body feature points stored in the storage by the stationary point storing means is less than the predetermined number, the stationary estimation model correcting means compensates a shortfall using a prepared human body feature point that corresponds to the at least one of the plurality of operational objects, to calculate the averaged actual posture point; and the prepared human body feature point of the at least one of the plurality of operational objects is selected among a plurality of prepared human body feature points that are correspondingly prepared for the plurality of operational objects.

16. An operation estimating apparatus comprising:

an image obtaining means for repeatedly obtaining images, each of the images having a plurality of operational objects and an operator that is positioned to be able to perform operations on the plurality of operational objects;

a human body feature point specifying means for specifying a predetermined human body feature point of the operator in each of the images that are repeatedly obtained by the image obtaining means; and an operation estimating means for estimating one of the operations, which the operator is going to perform, based on the human body feature points specified by the human body feature point specifying means in the images, wherein:

the operation estimating means compares an actual posture locus of the operator with a transitional estimation model for each of the operations by the operator to obtain a degree of approximation of the transitional estimation model to the actual posture locus, the transitional estimation model for the each of the operations being formed based on an estimated posture locus of the each of the operations, the operator being estimated to track the estimated posture locus to operate one of the plurality of operational objects that corresponds to the estimated posture locus, the actual posture locus of the operator being obtained based on the human body feature points specified by the human body feature point specifying means in the images;

the operation estimating means estimates that the operator is going to perform the one of the operations that corresponds to the estimated posture locus of the transitional estimation model having the degree of approximation that satisfies a predetermined threshold;

the transitional estimation model includes an estimation model that is formed based on the estimated posture locus tracked by the operator that performs a transitional operation as one of the operations; and the operator finishes operating a certain operational object of the plurality of operational objects, and then, starts operating another operational object of the plurality of operational objects in the transitional operation, the operation estimating apparatus further comprising:

an operation state monitoring means for detecting an operational state of at least one of the plurality of operational objects to determine that the at least one of the plurality of operation objects is operated; and a transitional estimation model correcting means for correcting the transitional estimation model that corresponds to the transitional operation based on the actual posture locus that is obtained based on the human body feature points specified by the human body feature point specifying means specified during an interval between (a) a time, at which the operation state monitoring means becomes unable to detect the operation on the certain operational object, which has been detected to be operated, and (b) a time, at which the operation state monitoring means detects the operation on the another operational object.

17. The operation estimating apparatus according to claim 16, further comprising:

a transitional locus storing means for storing in the storage a human body feature point group made of the human body feature points specified by the human body feature point specifying means during the interval, wherein:

the transitional estimation model correcting means corrects the transitional estimation model that corresponds to the transitional operation based on the actual posture locus obtained based on the human body feature point group stored in the storage when a predetermined correction condition is satisfied.

18. The operation estimating apparatus according to claim 17, wherein:

the transitional estimation model correcting means calculates an averaged actual posture locus based on a predetermined number of actual posture loci, each of which is obtained based on a corresponding one of the human body feature point groups stored in the storage; and the transitional estimation model correcting means updates the transitional estimation model that corresponds to the transitional operation to make the transitional estimation model into an estimation model, which is formed based on the averaged actual posture locus.

19. The operation estimating apparatus according to claim 18, wherein:

when a number of the human body feature point groups stored in the storage is less than the predetermined number, the transitional estimation model correcting means compensates a shortfall using a prepared human body feature point group that corresponds to the transitional operation to calculate the averaged actual posture locus; and the prepared human body feature point group of the transitional operation is selected among a plurality of prepared human body feature point groups that are correspondingly prepared for the operations.

* * * * *